United States Patent

Torok

[15] 3,646,428

[45] Feb. 29, 1972

[54] SYMMETRICAL VOLTAGE REGULATOR

[72] Inventor: Gabor Peter Torok, Lincroft, N.J.

[73] Assignee: Bell Telephone Laboratories, Incorporated, Murray Hill, Berkeley Heights, N.J.

[22] Filed: Nov. 27, 1970

[21] Appl. No.: 93,077

[52] U.S. Cl............................323/22 T, 307/15, 307/24, 307/53, 307/297, 323/8, 323/23
[51] Int. Cl............................G05f 1/60, G05f 5/00
[58] Field of Search..................307/12, 15, 20, 24, 32, 33, 307/35, 39, 51, 53, 60, 69, 77, 297; 323/22 T, 22 SC, 22 R, 23, 25

[56] References Cited

UNITED STATES PATENTS

| 3,458,711 | 7/1969 | Calkin et al. | 307/15 X |
| 3,571,604 | 3/1971 | La Porta | 323/23 X |

OTHER PUBLICATIONS

" Regulator Makes Two Power Supplies Out of One" by T. P. Sylan, EEE-Circuit Design Engineering-May 1966; Page 117.
" Voltage Splitter Balances Floating Power Supply" by J. M. Kasson Electronics, Mar. 21, 1966; Page 96.

Primary Examiner—Gerald Goldberg
Attorney—R. J. Guenther and E. W. Adams, Jr.

[57] ABSTRACT

Positive and negative voltage sources are connected to a conventional regulator which establishes a fixed voltage. A sensing circuit utilizing two transistors of opposite polarity monitors the fixed voltage and initiates conduction of one of the transistors in response to an imbalance between the amplitudes of the supply voltages with respect to ground or to a similar imbalance of the load. This causes additional current to flow from one of the supplies, thereby compensating for the imbalance and establishing symmetry with respect to the ground potential.

8 Claims, 2 Drawing Figures

PATENTED FEB 29 1972 3,646,428

INVENTOR
G. P. TOROK
BY David L. Hurst
ATTORNEY

SYMMETRICAL VOLTAGE REGULATOR

BACKGROUND OF THE INVENTION

The present invention relates to voltage supply circuits and more particularly, to a dual balanced voltage regulator for providing two voltages of identical magnitude which are symmetrical with respect to ground.

In some electronic applications a precise and balanced pair of oppositely poled voltages is required. The use of a zener diode to fix a reference voltage is well known and it has been proposed to utilize a precise inverting means, such as an operational amplifier, to produce from the regulated voltage, a pair of dual polarity voltages of identical magnitude. This technique and others known in the art result in complex and sophisticated circuits. It is an object of the present invention to provide a simple circuit which produces a balanced pair of positive and negative voltages which can be applied directly to a balanced load. It is a further object to provide a circuit which can insure symmetry even where the output is applied to an unbalanced load.

SUMMARY OF THE INVENTION

In accordance with the present invention a regulated voltage difference is established between two points in a conventional manner. A reference ground is selected and any change in the fixed voltage with respect to this ground due to an imbalance in supply voltage is utilized to conduct a compensating current from the supply source to ground. The current causes the regulated potential to shift to compensate for the supply voltage and insures symmetry of the fixed voltage potential with respect to the ground. In a like manner, imbalance of the load forces the shunting current to compensate and reestablish symmetry.

Positive and negative input potentials are connected through a serial arrangement of a first resistor, zener diode or other floating regulated voltage source, and a second, equal resistor. A sensing circuit utilizing two transistors of opposite polarity is connected across the diode and causes conduction of one or the other of the transistors in response to an imbalance between the amplitudes of the supply voltages with respect to ground. This causes current to flow from one of the supplies through its associated series resistor to ground, thereby compensating for the imbalance. The resultant symmetrically regulated dual voltages may be applied to a balanced load. If the load becomes unbalanced, the resultant increase in load current will cause a voltage shift identical to that which would be caused by an imbalance between the supply voltages and compensation for the lack of symmetry is provided in an identical manner.

BRIEF DESCRIPTION OF THE DRAWING

In the drawings, like numerals designate like elements in
FIG. 1, which is a schematic diagram of a symmetrical voltage regulator in accordance with the present invention, and in
FIG. 2, which is a schematic diagram of the circuit of FIG. 1 modified by the addition of impedance matching devices.

DETAILED DESCRIPTION

Figure 1:
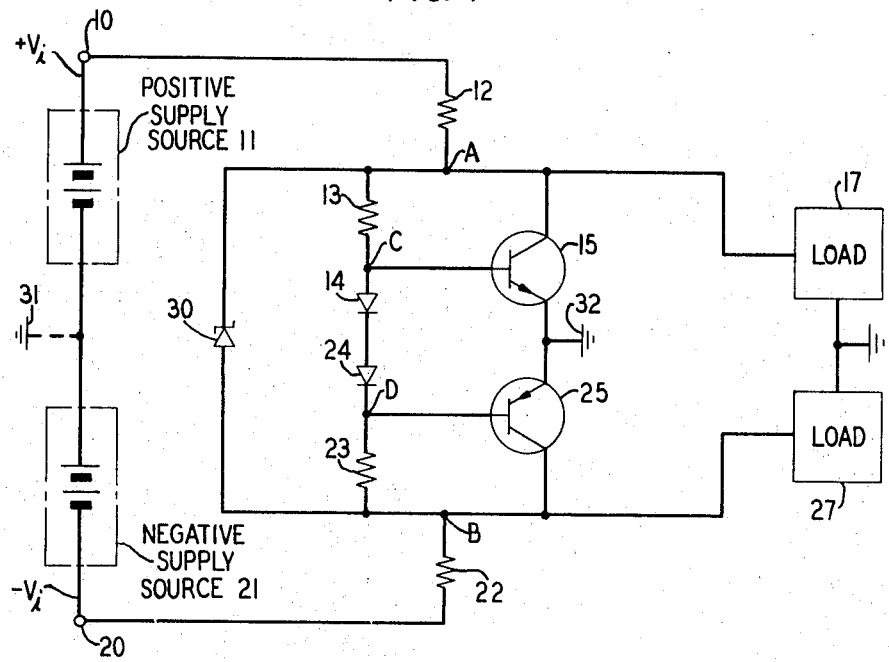

In some applications, such as certain television raster generating circuits and other precise electronic instrumentation, it is most important to have a power supply which provides balanced positive and negative voltages whose absolute values are identical. The circuits shown in the drawing insure equalization of a positive and negative output voltage if there is an imbalance between the positive and negative input voltages derived from the conventional power sources, or if there is an imbalance in the loads.

A symmetrical voltage regulator is shown in the drawing and elements designated 10–17 correspond symmetrically with those designated 20–27. In FIG. 1 two unregulated power supply sources 11 and 21 are connected to provide a positive voltage $+V_i$ and a negative voltage $-V_i$ at input points 10 and 20, respectively. These voltage sources may be batteries as indicated or any other conventional source of power, and may be either discrete sources optionally connected as shown to ground 31, or may be, in fact, a single ungrounded source, and the resultant voltages at points 10 and 20 may or may not be equal and may or may not be fixed relative to a ground, such as 31. The series combination consisting of a constant potential element, such as a zener diode 30, connected at output points A and B to two current limiting elements, such as resistors 12 and 22, respectively, act as a conventional regulator circuit. The unregulated input voltages $+V_i$ and $-V_i$ are applied to element 30 through resistors 12 and 22, respectively, and element 30 insures a fixed potential between points A and B.

Thus, the voltage potential between points A and B is regulated at a fixed magnitude, though these voltages have no fixed relation to a ground or any other reference potential. The series circuit, consisting of precision resistor 13, diodes 14 and 24, and precision resistor 23, forms a voltage regulator similar to that formed by resistors 12 and 22, in combination with element 30. Diodes 14 and 24 act to produce a fixed voltage between points C and D, the bases of transistors 15 and 25, though a precision resistor could replace these two diodes since the voltage between points A and B is regulated. The two diodes are preferred because the total voltage drop across the two diodes can be made to match the sum of the base-emitter drops of transistors 15 and 25, when they are on the verge of conduction.

If there is a shift in the voltage at points A and B (that is, an increase in one and a corresponding decrease in the other), an equivalent corresponding shift occurs between points C and D, causing a change in the base currents of transistors 15 and 25. This results in an increase of the conduction of one transistor and a decrease of the conduction of the other, the direction of the change depending upon the direction of the shift. If NPN-transistor 15 and PNP-transistor 25, both of whose emitters are connected to common ground 32, are appropriately biased, the difference in base currents will cause additional current to be drawn through either resistor 12 or resistor 22, resulting in an increased voltage drop across one of these resistors. This will act to shift the fixed voltage between points A and B, with respect to ground 32 and reestablish the symmetry of the voltages at these points with respect to ground 32, without affecting the magnitude of the fixed voltage between these pints. The voltage difference between points A and B is fixed by element 30 and equally balanced with respect to ground 32 by the shunting effect of the circuit. The voltages applied to balanced loads 17 and 27 are, therefore, identically equal in magnitude and opposite in polarity.

Transistors 15 and 25 are at the verge of conduction under balanced conditions. Points C and D are respectively one diode drop above and below ground 32. When input voltages $+V_i$ and $-V_i$ are of equal magnitude with respect to ground, transistor switches 15 and 25 are, therefore, on the verge of conduction if the base-to-emitter drops equal the diode drop. Any imbalance in the input voltages will shift the voltages at points C and D in one direction or the other, turning ON one of the transistors 15 or 25. The current drawn through the path opened by the switching of the transistors increases the voltage drop across resistor 12 or 22, such that a return to symmetry is assured.

The circuit in FIG. 1 also compensates for imbalance of loads 17 and 27. If the loads are not symmetrical with respect to ground 32, different currents will be drawn through resistors 12 and 22, and this will cause an additional imbalance in voltage drops across these two resistors. In a manner equivalent to the compensation for imbalance in supply voltage, this will cause a shift in voltage between points A and B, and the corresponding shift in voltage between points C and D, providing additional shunting to insure symmetrical voltages at points A and B in compensation for the imbalance between the loads 17 and 27.

Figure 2:
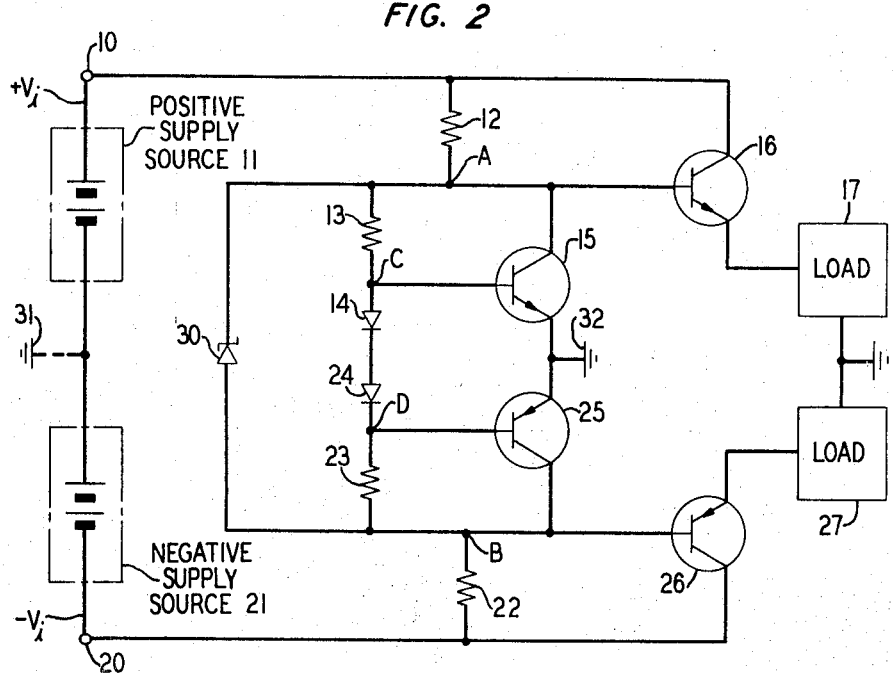

The circuit of FIG. 2 is identical in all respects to that of FIG. 1, with the sole exception of the addition of emitter-follower transistors 16 and 26 inserted between points A and B and loads 17 and 27, respectively; the collectors are connected to points 10 and 20, respectively. Transistors 16 and 26 are used to provide impedance isolation between the load and output points A and B by reducing the load current by an amount equivalent to the gain of the respective transistors.

The circuits of both FIGS. 1 and 2 are symmetrical and elements 11–16 are identical in value with corresponding elements 21–26. The circuits as described are extremely sensitive and can compensate for differences in voltage corresponding to deviations of small base currents of output transistors 16 and 26.

In all cases it is to be understood that the above-described arrangements are merely illustrative of a small number of the many possible applications of the principles of the invention. Numerous and varied other arrangements in accordance with these principles may readily be devised by those skilled in the art without departing from the spirit and scope of the invention.

What is claimed is:

1. A symmetrical voltage-regulating circuit comprising:
   a supply source for producing a voltage potential between two input points,
   means for providing a fixed voltage drop between a positive output point and a negative output point,
   means for resistively connecting said positive output point and one of said input points,
   means for resistively connecting said negative output point and the other one of said input points, and
   a sensing circuit connected between said positive and negative output points for initiating a conductive path to ground from either one of said two input points through the corresponding one of said connecting means in response to an inequality between the absolute values of potential relative to ground at said positive and negative output points to maintain the same absolute values of the potentials relative to ground at said positive and negative output points.

2. A symmetrical voltage-regulating circuit as claimed in claim 1 wherein said supply source consists of two sources each connected in common to said ground so that the potential at one of said input points is positive with respect to said ground and the potential at the other of said input points is negative with respect to said ground.

3. A symmetrical voltage-regulating circuit as claimed in claim 1 wherein said means for providing a fixed voltage drop between said positive and negative output points is a zener diode connected between said output points.

4. A symmetrical voltage-regulating circuit as claimed in claim 1 wherein said two connecting means are resistors of equal value so that the initiation of a conductive path through one of said resistors causes a voltage drop across said one resistor whereby the fixed potential between said output points is shifted with respect to ground.

5. A symmetrical voltage-regulating circuit as claimed in claim 1 wherein said sensing circuit includes a pair of oppositely poled transistors, the emitter of each connected in common to said ground and the collector of each connected to one of said output points, means for providing a fixed voltage potential between the bases of said transistors, and a pair of equal-valued resistors each connecting the base of one of said transistors to one of said output points.

6. A symmetrical voltage-regulating circuit as claimed in claim 5 wherein said means for producing a fixed voltage potential between the bases of said transistors is a pair of serially connected diodes, the sum of the two diode drops matching the sum of the base-to-emitter drops of said two transistors.

7. A symmetrical voltage-regulating circuit as claimed in claim 1 further comprising impedance isolation means connected to each of said output points.

8. A symmetrical voltage-regulating circuit comprising:
   a supply source for producing a voltage potential between a positive input point and a negative input point,
   a zener diode connected across positive and negative output points,
   a pair of equal-valued resistors each connecting one of said input points to one of said output points,
   a pair of oppositely poled transistors, the emitter of each connected to a common ground, the collector of each connected to one of said output points,
   a pair of serially connected diodes, the sum of their diode drops being equal to the sum of the base-to-emitter drops of said two transistors, connected between the bases of said transistors and a pair of equal valued resistors each connecting one of said output points to the base of one of said transistors.

* * * * *